Aug. 11, 1964    F. C. POWERS    3,144,340
STACKABLE CAKE
Filed June 18, 1962

INVENTOR.
FRANK C. POWERS
BY
ATTORNEYS

United States Patent Office 3,144,340
Patented Aug. 11, 1964

3,144,340
STACKABLE CAKE
Frank C. Powers, 24 Peterson Drive, Storm Lake, Iowa
Filed June 18, 1962, Ser. No. 203,197
1 Claim. (Cl. 99—92)

This invention relates to bakery goods, and more particularly to cake products.

Bakery establishments and merchandisers of baked cake products regularly encounter handling, storing, and merchandising problems caused by the incapacity of cakes to be stacked, one upon the other, without elaborate supporting and spacing assemblies. Cakes, especially light, fluffy angel food cakes, having myriads of air pockets are readily deformed by slight amounts of weight, to thus lose their aesthetic appeal and fluffy characteristics. Consequently, expensive cake boxes capable of providing uniform support for a stacked cake are fairly common items.

Another difficulty encountered with cake items and not usually associated with the stacking problem, is the freshness retention problem when the baked cake is removed from its bakery container and placed into a merchandizing container. This is especially true with angel food cakes, since the central opening is not browned during baking and allows loss of moisture readily. Consequently, there is needed a completely inexpensive packaging assembly enabling the cake to be baked therein and also to be merchandised therein while still providing an inexpensive disposable structure.

It is an object of this invention to provide a unique stackable cake assembly wherein packaged cakes can be readily handled, shipped and merchandised in a stacked condition, one upon another, without danger of damage of the lower cakes, and with a completely inexpensive and disposable packaging structure.

It is another object of this invention to provide a packaged cake product enabling retention of cakes such as angel food cakes in a unique efficient manner, and to do so at a relatively small expense.

It is another object of this invention to provide a packaged cake product wherein the components of the package assembly interfit in a unique manner, yet each being relatively inexpensive and formed of standard items available on the market.

It is another object of this invention to provide a unique cake product which simultaneously provides moisture retention and stackability, both due to the unique packaging structure utilized with the cake. Furthermore, the cake can be baked with the packaging elements in place serving to support and define the boundaries of the cake batter. The cake batter, moreover, seals the junctures of the parts forming the cake packaging structure, and seals against the walls of the container in which it is baked to thereby enable the cake to retain its freshness quality over an extended merchandising time. Thus, the novel cake product includes means forming a baking container, a stacking container, and a freshness retaining merchandising container.

It is another object of this invention to provide a packaged cake product wherein portions of the packaging may be utilized to retain additional materials such as cake topping, recipes or the like.

It is still a further object of this invention to provide a novel method of baking cakes wherein the baked product in its original container may be merchandised without further additions or changes to the product, other than the covering of the top of the cake. The invention includes covering the cake top with a plastic cover that may also be utilized by the housewife as a bowl cover when it is removed from the cake product.

These and several other objects of this invention will be apparent upon studying the following specification in conjunction with the drawings in which.

Basically, the inventive stackable cake comprises a cake item having a centrally located frusto-conical opening with a generally frusto-conically shaped vertical cup element in the opening in firm contact with the side walls of the opening, a supporting element under the cake and having portions beneath the central opening of the cake interfitting with the cup element to align the cake on the support element and provide stacking support. The cup element includes portions extending above the upper surface of the cake to contact a support element of a second stackable cake.

In one form of the invention, the cup and cake have the widest diameter adjacent the upper surface of the cake, with reinforced ridges at the upper end of the cup to support a second plate and cake above it. The cup includes a generally convex lower surface interfitting with a slight depression in the supporting element, preferably a plate.

In another form of the invention, an inverted cup with the wide diameter at the bottom interfits with severed and deformed portions of a supporting container, and has its upper end protruding above the surface of the cake to support another container and cake thereabove.

Preferably, in either form of the invention, the cake top is enclosed with a removale flexible plastic cover having an elastic band around its periphery to seal the top of the cake. The plastic cover can be utilized as a bowl cover when removed from the cake.

Figure 1:
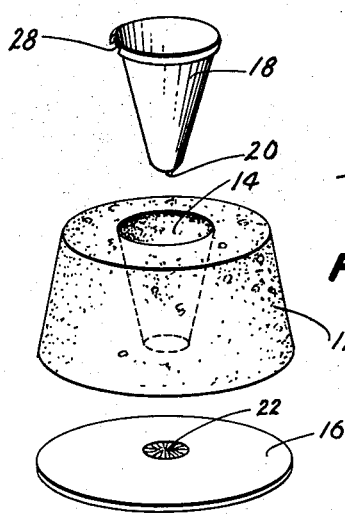
FIG. 1 is an exploded perspective view of one form of the novel cake product.

Referring to the drawings, in FIG. 1 the cake product 10 is shown including its main components of the baked cake 12 such as an angel food cake, having a frusto-conical central opening 14 therein, a lower supporting element, preferably a plate 16, and a frusto-conical or generally truncated cup element 18 interfitting with the opening 14. In this preferred form of the invention, opening 14 and the cup have their widest diameter adjacent the top of the cake. The walls of the cup interfit tightly with the walls of the opening 14. Weight placed on the top edge of the cup is thereby partially distributed to the cake over the walls. The bottom end 20 of the cup 18 is generally convex in nature and interfits with a depression or cavity 22 in the central part of plate 16 and under opening 14.

Figure 2:
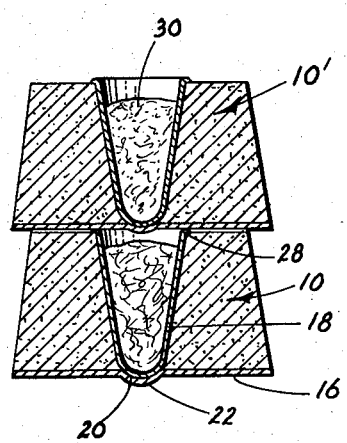
FIG. 2 is a sectional view of two of the novel cake products shown in stacked position.
Figure 3:
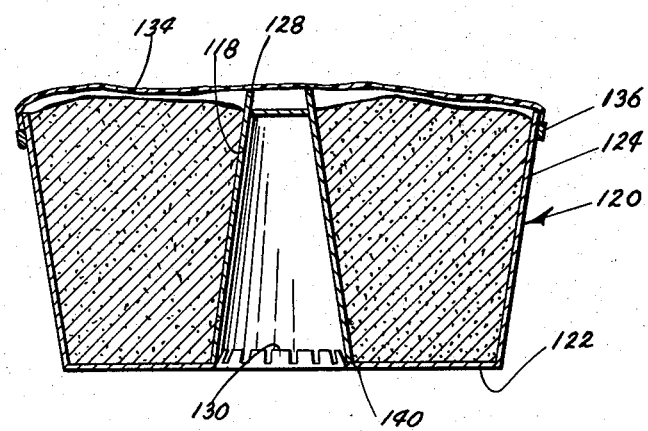
FIG. 3 is a sectional view showing a second form of the novel cake product in its final packaged form.
Figure 4:
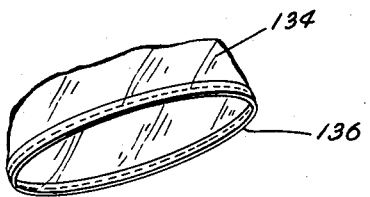
FIG. 4 is a perspective view of the plastic cover element utilized as the removable cake top cover in FIG. 3.

Thus, referring to FIG. 2, the cup, plate, and cake interfit to support a stackable assembly. When the cake product is assembled and stacked as shown, the weight of the upper cake 10' rests upon the reinforced ridge 28 of the lower cup 18. The pressure exerted upon cup 18 is partially distributed evenly over the walls of opening 14 in the cake assembly 10, and partially on plate 16 where the convex end 20 of the cup interfits with the depression 22 of the plate. The intercooperation of the plate, cup and cake serves to support cakes stacked thereon in a unique manner to prevent any crushing of the lower cakes. Conceivably the depression 20 could be a cavity cut clear through the plate as long as the cup 18 could physically engage the peripheral edge of the opening to obtain support and alignment therefrom. However, the preferred form is the depression cavity shown. The alignment of plate 16 with cup 18 by this interfit makes a neat, stable assembly.

If desired, the cup may be used as a container of any suitable material such as a plastic bag filled with topping 30, recipes, or any other material desired.

Plate 16 and cup 18 are preferably formed of glassine coated paper, but obviously other equivalent materials may be utilized. It has been found that paper serves very adequately as the baking container, as well as the shipping and merchandising container for angel food cakes.

In another form of the invention, cup 118 is used in combination with a support which also comprises a container 120 having a bottom portion 122 and a peripheral side wall portion 124. In this form of the invention, cup 118 is inverted with its larger diameter portion at the bottom, and its smaller diameter portion at the top. It will be realized that the pressure of cakes stacked above this cake assembly will not be able to distribute the weight upon the walls of the central frusto-conical opening. In this case, the weight of cakes stacked thereon is supported on ridge 128 of the cup which transmits all of the force directly to the bottom 122 of the container 120. Alignment and thus stability is obtained between the cup and container by severing and upwardly deforming tabs 130 from the container over which the ridge of the cup fits. The cup does tightly seal the walls of the opening to prevent moisture loss and retain freshness. This container is preferably formed of a thin disposable aluminum material, but other materials can be used. The cup 118 is preferably formed of a glassine coated paper. To retain the freshness of the cake product, a thin, flexible, plastic cover 134 of a material such as polyethylene is placed over the top of each assembly. It preferably has a peripheral elastic band 136 to grip tightly against the side wall 124 of the container 120 and provide a moisture retaining assembly.

During the baking operation of the second form of the inventive product, pan 124 is formed to the proper configuration and the tabs 130 are severed and deformed therefrom. Then the cup 118 is inverted and placed around the tabs resting upon the bottom 122. Then the batter which is unbaked is poured into the container and around the cup to seal tightly against the container wall, the cup, and to seal the juncture 140 between the cup and container. Then the product is baked so that the cake continues to seal against the cup, container wall, and at the juncture 140 to retain moisture, and stay fresh over a long period of time. After the cover 134 is placed over the assembly, the product is shipped, handled and merchandised without further change. When the housewife removes cover 134, the cake is still completely fresh. Further, she may utilize the cover 134 as a bowl cover, or for other uses, and merely disposes of the remaining container and stacking elements.

It has been found that the novel package assembly enables the baking and merchandising of angel food cakes at tremendous savings in comparison to known methods. Further, the unique assembly may be utilized to stack cakes without damage to the lower cakes, and without expensive boxes or other similar packaging assemblies heretofore used. Moreover, the containers are completely disposable in nature and need not be returned by retail stores to the bakery as is the case with cake baking containers which are presently used both for baking and merchandising purposes. The container does not detract from the normal aesthetic appeal of the bakery product. The parts of the container are readily aligned due to inexpensive deformations thereof, to form a stable assembly even though the assembly is the ultimate in simplicity. The freshness period of the cakes is unusually long. The package components are relatively inexpensive and disposable and thereby convenient to use. The cup portion may be used as a container for topping, recipes, or other items if desired, and the plastic cover may even be used as a bowl cover by housewives.

Various other advantages and modifications within the principles of the invention as taught may be apparent to those skilled in the art upon studing the foregoing specification and illustrated forms of the invention. Such obvious modifications are deemed to be part of this invention, which is to be limited only by the scope of the appended claim and the reasonably equivalent structures and methods of those defined herein.

I claim:

A stackable cake comprising: a cake having a centrally located frusto-conical opening therein; said opening having its larger diameter adjacent the top of said cake; a generally truncated conical cup element in said opening in contact with the walls thereof to partially distribute weight of additional cakes on said cup evenly over said cake walls; said cup element having its larger diameter at the top of said cake, and having a ridge portion extending above the top surface of said cake which enables an additional cake to be stacked thereon; a support plate under the bottom of said cake and having a central cavity beneath said cake opening; and said cup having its lower surface interfitting in said cavity, whereby said cake is held aligned with said plate, and whereby said cup, due to its interfitting support on said plate, due to its tapered wall support on the walls of said cake opening, and due to its upper ridge, enables said cake to support a plurality of stacked cakes without damage.

References Cited in the file of this patent

UNITED STATES PATENTS

| | | |
|---|---|---|
| 2,039,374 | Young | May 5, 1936 |
| 2,271,921 | Luker | Feb. 3, 1942 |
| 2,409,279 | Hiller | Oct. 15, 1946 |
| 2,960,218 | Cheeley | Nov. 15, 1960 |